(12) United States Patent
Bogachuk et al.

(10) Patent No.: US 11,628,487 B2
(45) Date of Patent: Apr. 18, 2023

(54) VEHICLE COMPONENT JOINING ASSEMBLY

(71) Applicant: Ford Global Technologies, LLC, Dearborn, MI (US)

(72) Inventors: Vladimir Vladimirovich Bogachuk, West Bloomfield, MI (US); Shawn Michael Morgans, Chelsea, MI (US); Amanda Kay Freis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 17/365,972

(22) Filed: Jul. 1, 2021

(65) Prior Publication Data

US 2022/0126354 A1 Apr. 28, 2022

Related U.S. Application Data

(62) Division of application No. 17/078,661, filed on Oct. 23, 2020, now Pat. No. 11,084,085.

(51) Int. Cl.
*B21D 53/88* (2006.01)
*F16B 25/00* (2006.01)
(Continued)

(52) U.S. Cl.
CPC ............ *B21D 53/88* (2013.01); *B21J 5/066* (2013.01); *F16B 5/02* (2013.01); *F16B 25/001* (2013.01); *F16B 25/106* (2013.01); *F16B 43/02* (2013.01)

(58) Field of Classification Search
CPC ........ F16B 43/02; F16B 5/025; F16B 25/106; B21J 5/066
See application file for complete search history.

(56) References Cited

U.S. PATENT DOCUMENTS 4,860,513 A * 8/1989 Whitman .............. E04D 3/3603
411/533
5,361,478 A * 11/1994 Grossberndt ......... F16B 25/106
29/432
(Continued)

FOREIGN PATENT DOCUMENTS

DE 102012211638 5/2014
DE 102015008719 A1 * 1/2017
EP 2246578 A1 * 11/2010 .............. F16B 43/02

OTHER PUBLICATIONS

DE-102015008719-A1 machine translation (Year: 2017).*

*Primary Examiner* — Michael W Hotchkiss
(74) *Attorney, Agent, or Firm* — Vichit Chea; Carlson, Gaskey & Olds, P.C.

(57) ABSTRACT

A vehicle assembly includes a first component having a stand-off that provides a cavity. The stand-off protrudes from an insertion side of the first component. The stand-off includes at least one side wall that extends from a floor of the cavity to at least one outer surface of the stand-off. The assembly further includes a second component that contacts the first component at an interface. The cavity is configured to receive a mechanical fastener that joins the first component to the second component. A distance between the floor of the cavity and the interface is greater in some areas than in other areas such that a cross-sectional thickness at a bottom of the cavity is varied.

16 Claims, 4 Drawing Sheets

(51) Int. Cl.
    *F16B 43/02*           (2006.01)
    *F16B 5/02*            (2006.01)
    *F16B 25/10*           (2006.01)
    *B21J 5/06*            (2006.01)

(56) References Cited

U.S. PATENT DOCUMENTS

| | | | | |
|---|---|---|---|---|
| 5,885,034 A * | 3/1999 | Fergusson | | F16B 31/028 411/10 |
| 7,850,410 B1 * | 12/2010 | Curtis | | F16B 43/001 411/537 |
| 8,388,665 B2 * | 3/2013 | Eberlein | | A61B 17/8047 606/286 |
| 8,844,869 B2 | 9/2014 | Andre | | |
| 8,857,040 B2 | 10/2014 | Freis | | |
| 9,016,972 B2 * | 4/2015 | Oetlinger | | F16B 12/50 403/252 |
| 9,050,933 B2 * | 6/2015 | Saje | | B62D 25/08 |
| 9,126,631 B2 * | 9/2015 | Lungershausen | | F16B 5/0241 |
| 9,151,307 B2 | 10/2015 | Freis | | |
| 9,441,662 B2 * | 9/2016 | Susnjara | | F16B 25/0015 |
| 9,469,348 B2 * | 10/2016 | Saje | | B62D 21/03 |
| 9,488,210 B2 * | 11/2016 | Freis | | F16B 25/106 |
| 9,669,877 B2 | 6/2017 | Maeda et al. | | |
| 9,695,853 B2 * | 7/2017 | Norton | | F16B 5/02 |
| 9,988,093 B2 * | 6/2018 | Pastrick | | B62D 23/005 |
| 10,144,458 B2 * | 12/2018 | Wilhelm | | B62D 27/026 |
| 10,183,700 B2 | 1/2019 | Hata | | |
| 10,239,112 B2 * | 3/2019 | Norton | | F16B 25/106 |
| 10,371,192 B2 | 8/2019 | Dayton et al. | | |
| 10,385,755 B2 | 8/2019 | Liu et al. | | |
| 10,393,165 B2 | 8/2019 | Kulzer | | |
| 10,745,055 B2 | 8/2020 | Pastrick et al. | | |
| 10,875,583 B2 * | 12/2020 | Stojkovic | | B62D 33/02 |
| 2008/0058817 A1 * | 3/2008 | Eberlein | | F16B 5/025 606/285 |
| 2009/0320404 A1 * | 12/2009 | Shawe | | E04B 1/24 52/745.21 |
| 2011/0108690 A1 * | 5/2011 | Owen | | F16B 43/02 248/224.8 |
| 2013/0195579 A1 | 8/2013 | Freis | | |
| 2014/0079492 A1 * | 3/2014 | Mayrhofer | | F16B 43/02 405/259.1 |
| 2015/0001885 A1 | 1/2015 | Saje et al. | | |
| 2015/0003902 A1 * | 1/2015 | Saje | | F16B 5/02 403/306 |
| 2019/0284796 A1 * | 9/2019 | Bowker | | E04B 1/14 |
| 2019/0390455 A1 * | 12/2019 | Knapp | | E04B 1/40 |
| 2020/0047810 A1 * | 2/2020 | Ayukawa | | B62D 25/082 |
| 2020/0070896 A1 * | 3/2020 | Maier | | B62D 27/023 |
| 2020/0232491 A1 * | 7/2020 | Oetlinger | | F16B 37/047 |
| 2020/0271146 A1 * | 8/2020 | Plass | | B21J 5/066 |
| 2021/0364027 A1 * | 11/2021 | Cogburn | | A47G 1/17 |

\* cited by examiner

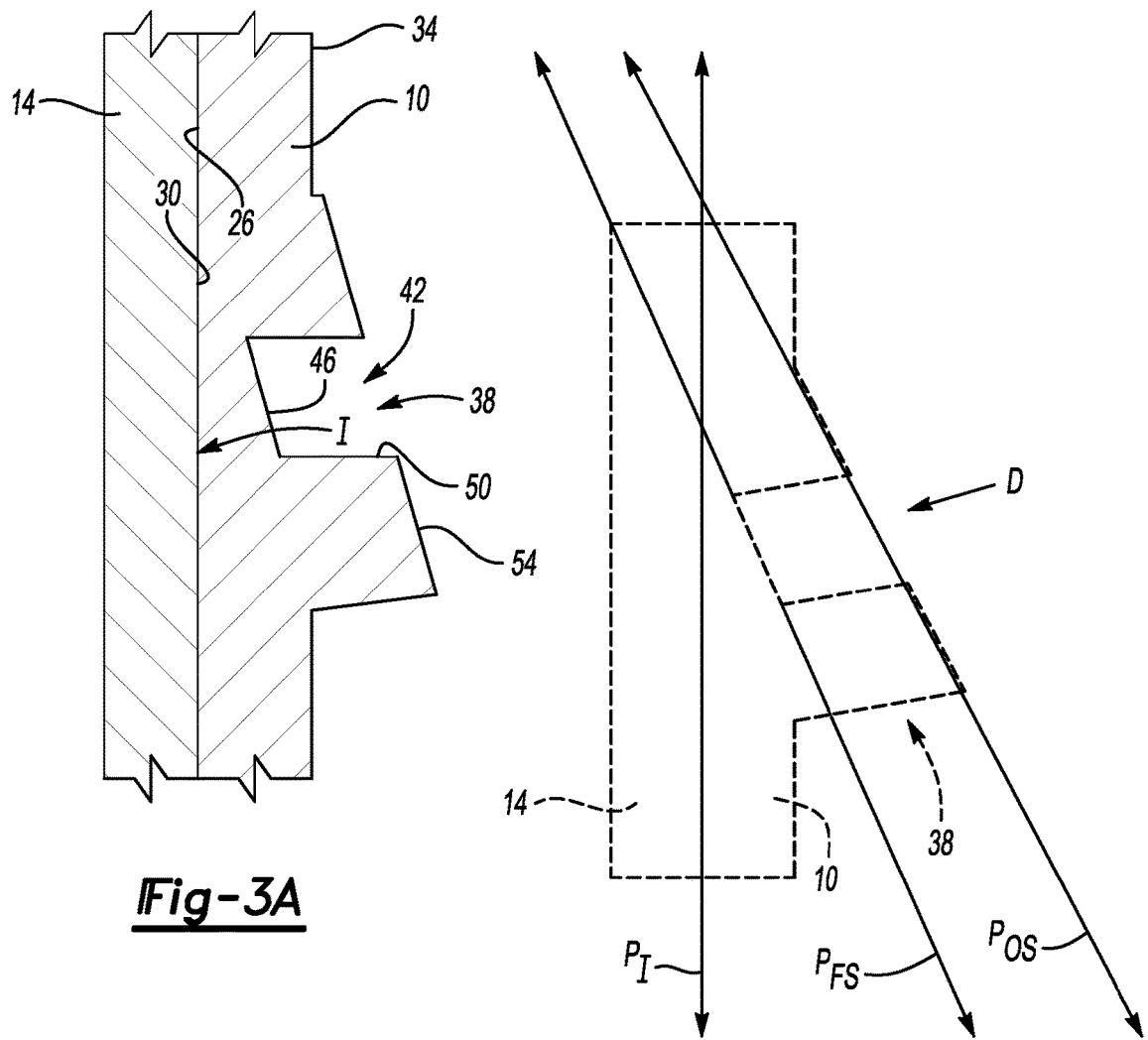
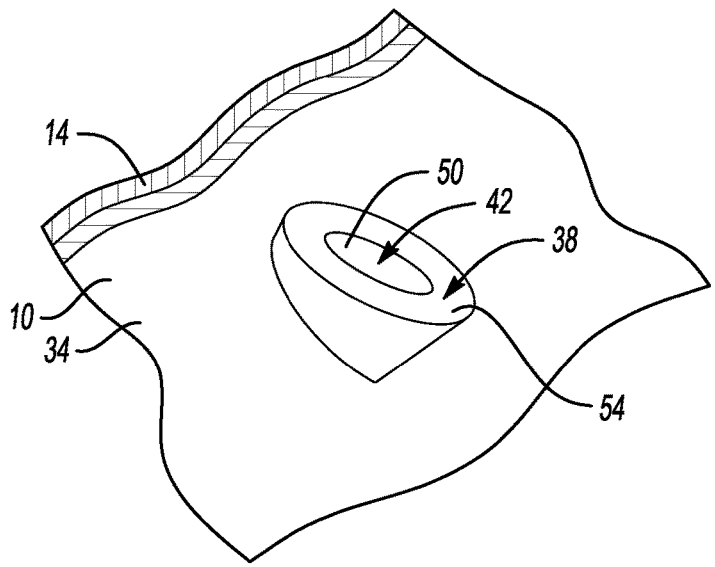

VEHICLE COMPONENT JOINING ASSEMBLY

CROSS-REFERENCE TO RELATED APPLICATIONS

This application is a divisional of U.S. patent application Ser. No. 17/078,661, which was filed on 23 Oct. 2020 and is incorporated herein by reference.

TECHNICAL FIELD

This disclosure relates generally to joining components together using a fastener driven by a tool.

BACKGROUND

One-sided joining operations can be used to join components together. One-sided joining operations can involve using a tool to drive a fastener into an installed position. Flow drilling is an example one-sided joining operation. When flow drill screwing, a fastener can be rotated and driven through the components to be joined. The fastener can both create its own hole and form threads.

SUMMARY

A vehicle component joining method according to an exemplary aspect of the present disclosure includes, among other things, positioning a contact side of a first component adjacent a contact side of a second component, inserting a mechanical fastener into a cavity of the first component, and rotating the mechanical fastener to drive the mechanical fastener through an interface between the contact sides of the first and second components. The interface is disposed along an interface plane and the mechanical fastener is driven through the interface in a direction that is nonperpendicular to the interface plane.

In another example of the foregoing method, prior to the driving, a floor of the cavity is disposed along a floor plane that is transverse to the interface plane.

In another example of any of the foregoing methods, prior to the rotating, the first component has a reduced cross-sectional thickness at a bottom of the cavity relative to an area of the first component surrounding the cavity.

In another example of any of the foregoing methods, prior to the rotating, a distance between a floor of the cavity and the interface is greater in some areas than in other areas such that a cross-sectional thickness at a bottom of the cavity is varied.

Another example of any of the foregoing methods includes providing the cavity within a stand-off of the first component. The stand-off protrudes from an insertion side of the first component.

In another example of any of the foregoing methods, the stand-off includes at least one side wall that extends from a floor of the cavity to an outer surface of the stand-off. The outer surface is disposed along an outer surface plane. The interface plane is transverse to the outer surface plane.

In another example of any of the foregoing methods, the outer surface of the stand-off is configured to directly contact a head of the mechanical fastener after the rotating when the mechanical fastener is joining together the first and second components.

In another example of any of the foregoing methods, prior to the rotating, the first component and the second component do not provide a clearance throughhole for the mechanical fastener.

In another example of any of the foregoing methods, the mechanical fastener is a single-sided fastener.

In another example of any of the foregoing methods, the mechanical fastener is a flow drill screw.

In another example of any of the foregoing methods, the first component is a cast component.

In another example of any of the foregoing methods, the second component is an extruded component.

Another example of any of the foregoing methods includes rotating the mechanical fastener during the driving using a torque tool. A reference axis extends away from the interface plane in a direction normal to the interface plane. The torque tool and the mechanical fastener are tilted away from the reference axis during the rotating.

A vehicle component joining method according to another exemplary aspect of the present disclosure includes rotating a mechanical fastener to drive the mechanical fastener through an interface between a first component and a second component. The interface is disposed along an interface plane. The method further includes, during the rotating, creating an aperture in the first component and an aperture in the second component. The method still further includes stopping the rotating after the mechanical fastener is in a seated position where the mechanical fastener joins the first component to the second component. When the mechanical fastener is in the seated position, a longitudinal axis of the mechanical fastener is tilted away from an axis that is normal to the interface plane.

In another example of the foregoing method, prior to the rotating, the first component does not define a clearance hole. Further, prior to the rotating, the second component does not define a clearance hole.

In another example of any of the foregoing methods, the mechanical fastener is a flow drill screw.

In another example of any of the foregoing methods, the mechanical fastener is a single-sided fastener.

A joined vehicle assembly according to yet another exemplary aspect of the present disclosure includes, among other things, a first component having a stand-off that provides a cavity, a second component contacting the first component at an interface, and a mechanical fastener joining the first component to the second component. The mechanical fastener has a head and a shaft extending from the head. The head directly contacts the stand-off. The shaft extends along a longitudinal axis of the mechanical fastener through the cavity and the interface between the first and second components. The longitudinal axis of the mechanical fastener is oriented nonperpendicular to the interface.

In another example of the foregoing assembly, the mechanical fastener is a single-side fastener.

In another example of any of the foregoing assemblies, the mechanical fastener is a flow drill screw.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 3A illustrates a close-up view of an area in FIG. 3 showing a stand-off of the first component.

FIG. 3B illustrates a perspective view of the stand-off of the first component in FIG. 3.

FIG. 4 illustrates a highly schematic view showing how an interface between the first component and the second component is oriented relative to the stand-off and other areas of the first component.

DETAILED DESCRIPTION

This disclosure details a method of joining components together using a fastener. The fastener can be a one-sided fastener driven by a tool. One of the components includes a feature that facilitates driving the fastener while keeping the tool clear of surrounding components.

Figure 1:
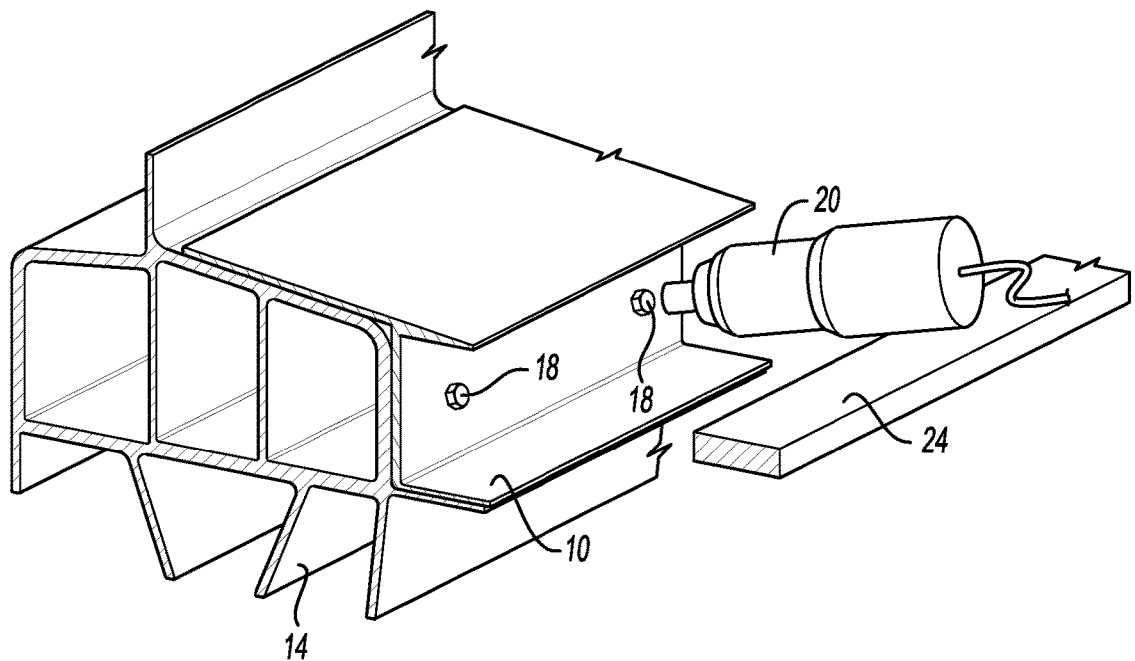
FIG. 1 illustrates a perspective and section view of a first component and a second component secured to each other in a joined position. A neighboring component is also shown.

Referring to FIG. 1, a first component 10 is joined to a second component 14 using at least one mechanical fastener 18. In the exemplary embodiment, the fastener 18 is a single-sided fastener.

A tool 20 is used to drive the fastener 18 into an installed position. The tool 20 can engage and drive the fastener 18 without interference from other components, such as a neighboring component 24.

In the exemplary embodiment, the first component 10 is a cast vehicle component. In another example, the first component 10 is a composite material that is molded. In yet another example, the first component 10 could be extruded. The second component 14 is an extruded component, such as an extruded component utilized to provide a rail of a vehicle subframe. The second component 14 could be stamped, or cast in other examples.

A person having skill in this art and the benefit of this disclosure would be able to structurally distinguish components that are extruded or cast from component that are not extruded or cast. Thus, specifying that a component is an extruded component or a cast component implicates structure to that component.

Figure 2:
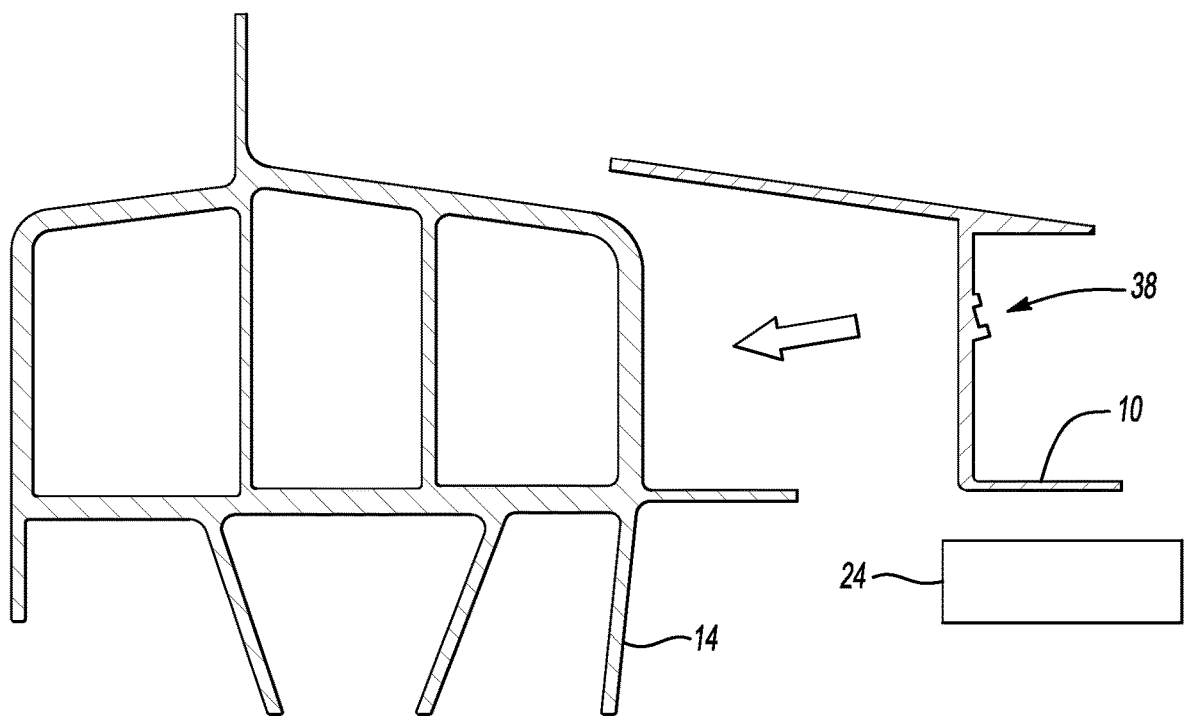
FIG. 2 illustrates an end view of the components of FIG. 1 as the first component is moving toward a position where the first component can be secured to the second component.
Figure 3:
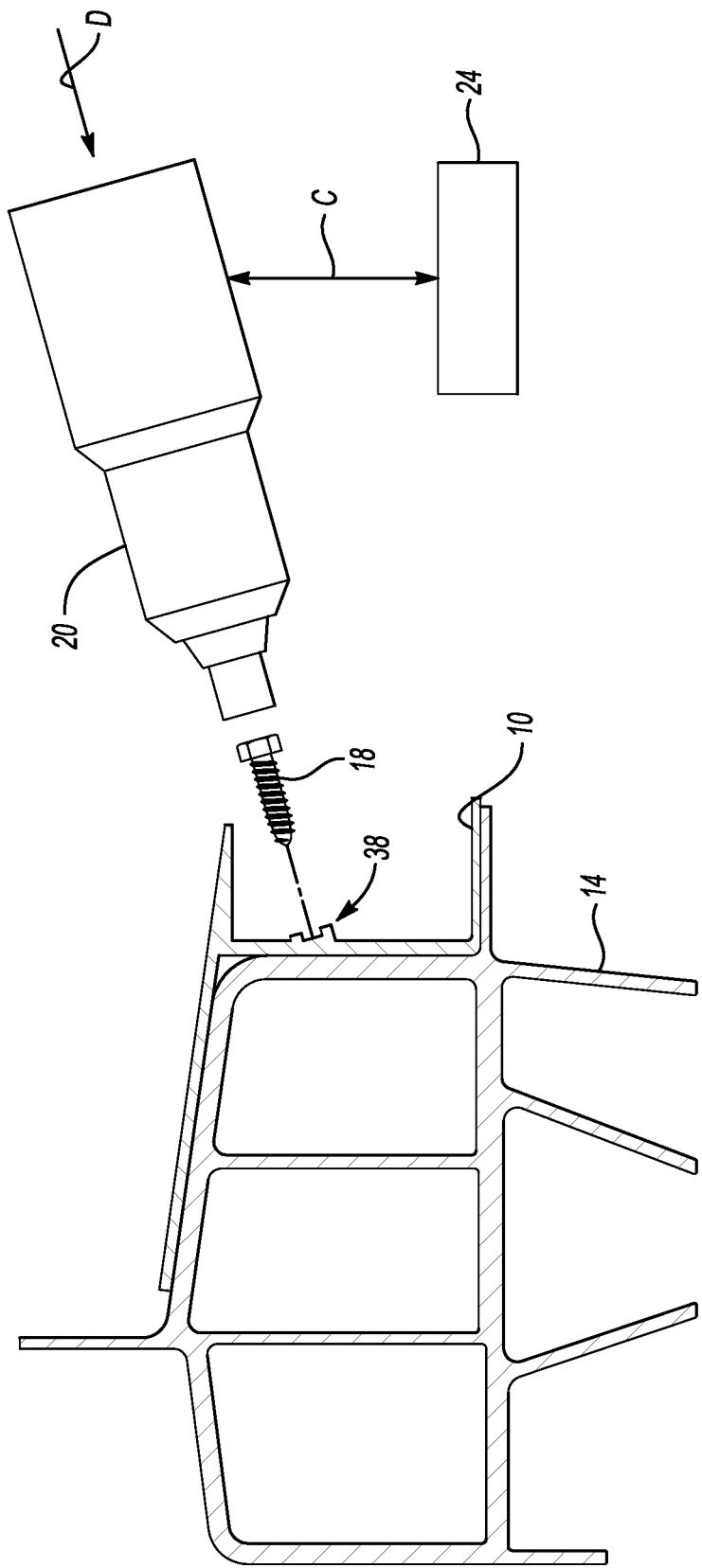
FIG. 3 illustrates the end view of FIG. 2 when a tool is moving in a direction D to drive a fastener that secures the first component to the second component in the joined position.

During assembly, the first component 10 is moved against the second component 14 from the position of FIG. 2 to the position shown in FIGS. 3-3B where the first component can be secured to the second component in the joined position. When the first component 10 and second component 14 are in the position of FIGS. 3-3B, the tool 20 can be used to drive the fastener 18 in a direction D until the fastener 18 joins together the first component 10 and the second component 14.

As shown in FIGS. 3-3B, the first component 10 has a contact side 26 that directly contacts a contact side 30 of the second component 14 along an interface I. The first component 10 has an insertion side 34 that opposes the contact side 26 of the first component 10.

A stand-off 38 of the first component 10 protrudes from the insertion side 34. The stand-off 38 provides a cavity 42. In the exemplary embodiment, boundaries of the cavity 42 are established by a floor 46 and at least one sidewall 50. The at least one sidewall 50 extends from the floor 46 of the cavity 42 to at least one outer surface 54 of the stand-off 38. The fastener 18 is positioned within the cavity 42 during the securing operation. The cavity 42 can help to locate the fastener 18 during the securing operation. The first component 10 can be cast to include the stand-off 38. If the first component 10 is instead extruded, the stand-off 38 could be one or more ribs that extend along a longitudinal length of the component 10.

As schematically shown in FIG. 4, the interface I is disposed along an interface plane $P_I$ and the floor 46 is disposed along a floor plane $P_{FS}$, which is transverse relative to the interface plane $P_I$.

Due to the tilting of the floor 46 relative to the interface I, a distance between the floor 46 and the interface I is greater in some areas than in other areas such that a cross-sectional thickness at a bottom of the cavity 42 is varied.

The outer surface 54 of the stand-off 38 is disposed along an outer surface plane $P_{OS}$ that, in the exemplary embodiment, is parallel to the floor plane $P_{FS}$ and angled transversely to the interface plane $P_I$.

In the exemplary embodiment, the direction D that the tool 20 drives the fastener 18 is perpendicular to the floor plane $P_{FS}$. As the outer surface plane $P_{OS}$ is parallel to the floor plane $P_{FS}$, the direction D is also perpendicular to the outer surface plane $P_{OS}$. Keeping the outer surface plane $P_{OS}$ perpendicular to the direction D in which the fastener 18 is driven can help to lessen the likelihood that a drive feature on a head if the fastener 18 is not stripped. If the outer surface plane $P_{OS}$ is not perpendicular to the direction D, the head of the fastener 18 may rotate near the end of the drive cycle, resulting in a loss of contact between the tool 20 and the fastener 18.

The direction D is nonperpendicular to the interface plane $P_I$. That is, the fastener 18 is driven through the interface I in a direction D that is nonperpendicular to the interface plane $P_I$. The tool 20 rotates the fastener 18 to drive the fastener 18 through the interface I into the installed position. During the driving, the longitudinal axes of the tool 20 and the fastener 18 are tilted away from an axis that is normal to the interface plane $P_I$.

The fastener 18, in the exemplary embodiment, is a flow drill screw. As the flow drill screw is rotated by the tool 20, here a torque tool, the material of the first component 10 and the second component 14 is heated and penetrated by the flow drill screw. Notably, the first component 10 and the second component 14 do not include throughbores that need to be formed and aligned prior to being joined by the fastener 18. Instead, the fastener 18 moves material of the first component 10 and the second component 14 to create apertures as the fastener 18 is driven.

The flow drill screw is a single-sided fastener as the flow drill screw can join the first component 10 to the second component 14 without accessing a side other than the insertion side 34 of the first component 10. Other single-sided fasteners could be utilized in other examples to join the first component 10 to the second component 14. For example, the fastener 18 could be a tack that is moved to an installed position in a high-speed tacking operation. The fastener 18 could also be a standard thread cutting fastener.

As understood, a flow drill screw is often configured to be driven through a surface while generally perpendicular to the surface. In the exemplary embodiment, the fastener 18 is driven in the direction D, which is perpendicular to the floor 46. Since the floor 46 is tilted to face slightly upward, the direction D can slope downward toward the floor 46. This enables the tool 20 to drive the fastener 18 into a seated position without the neighboring component 24 contacting or otherwise interfering with the driving of the fastener 18. If the fastener 18 needed to be driven perpendicular to the interface plane $P_I$, the neighboring component 24 would interfere with the tool 20.

In the exemplary embodiment, the stand-off 38 provides the cavity 42. Due to the cavity 42, the first component 10 has a cross-sectional thickness at the bottom of the cavity 42 that is reduced when compared to the cross-sectional thickness of areas of the first component 10 surrounding the cavity 42, such as the remaining portions of the stand-off 38. The reduced cross-sectional thickness at the bottom of the cavity 42 leads to the fastener 18 needing to move less material in order to penetrate the first component 10 than if the cross-sectional thickness at the bottom of the cavity 42 were not reduced.

Figure 5:
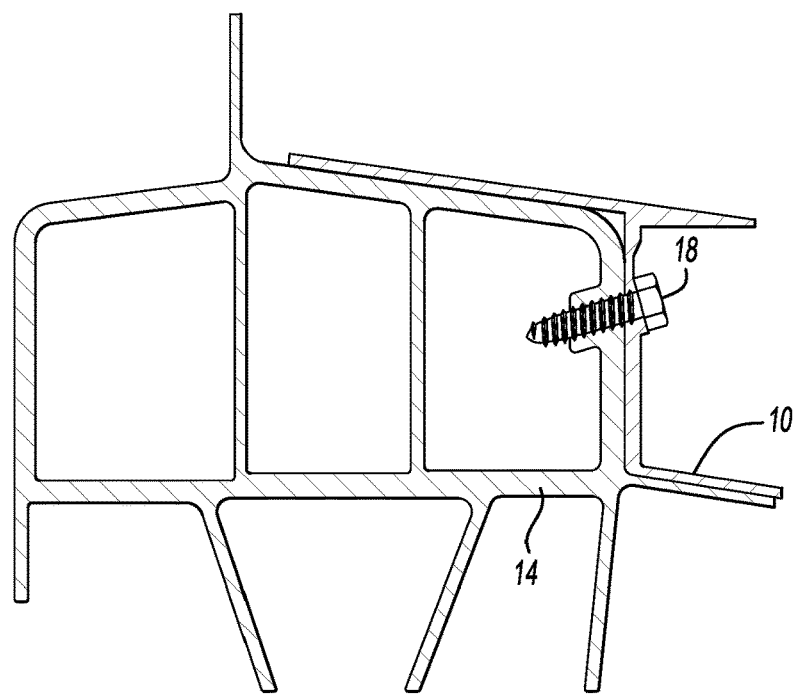
FIG. 5 illustrates an end view of FIG. 1.
Figure 5A:
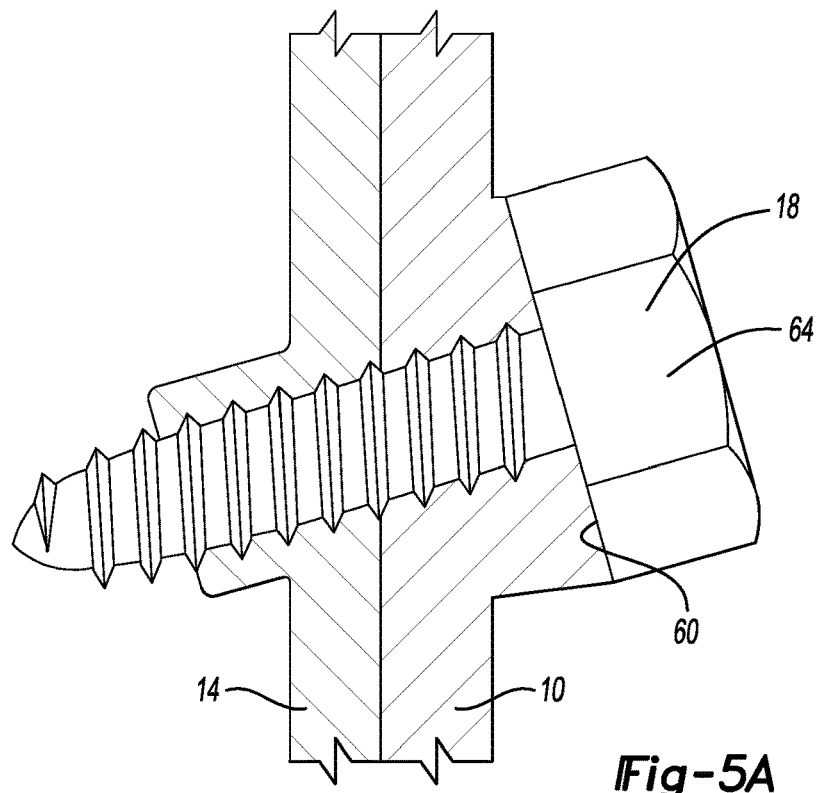
FIG. 5A illustrates a close-up view of an area in FIG. 5 showing the fastener extending through the interface between the first component and the second component.

In FIGS. 5 and 5A, when the fastener 18 has been driven by the tool 20 into the seated position, the fastener 18 is joining the first component 10 to the second component 14. An underside 60 of a head 64 of the fastener 18 directly contacts the outer surface 54 of the stand-off 38 when the fastener 18 is joining together the first component 10 and the second component 14.

The example fastener 18 is shown as joining two components. The fastener 18 could, in other examples, join more than two components.

Some exemplary features of the disclosed examples include a first component having cavity with a floor that is angled relative to an interface between the first and a second component. The angling or tilting of the floor enables a tool to drive a fastener through the interface when the fastener is nonperpendicular to the interface. This helps the tool avoid interference with neighboring components. The first component can be cast, which can facilitate the formation of the cavity having the angled floor. A stand-off feature can provide the cavity.

The fastener can be a single-sided fastener that can be moved to a seated position without access to another side of the first and second components, and without requiring throughbores in the first and second components prior to driving the fastener.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle assembly, comprising: a first component having a stand-off that provides a cavity, the stand-off protruding from an insertion side of the first component, the stand-off including at least one side wall that extends from a floor of the cavity to at least one outer surface of the stand-off; and a second component contacting the first component at an interface, wherein the cavity is configured to receive a mechanical fastener that joins the first component to the second component, wherein the at least one outer surface of the stand-off is disposed along an outer surface plane, and the interface is disposed along an interface plane that is transverse to the outer surface plane, wherein the insertion side is disposed along an insertion side plane that is transverse to the outer surface plane, wherein a distance between the floor of the cavity and the interface is greater in some areas than in other areas such that a cross-sectional thickness at a bottom of the cavity is varied, wherein the first component does not provide a clearance throughhole for the mechanical fastener prior to rotating the mechanical fastener to drive the mechanical fastener through the floor; wherein the at least one side wall is an at least one inner side wall, the stand-off further including at least one outer side wall extending from the insertion side of the first component to the at least one outer surface.

2. The vehicle assembly of claim 1, wherein the mechanical fastener is a single-sided fastener.

3. The vehicle assembly of claim 1, wherein the mechanical fastener is a flow drill screw.

4. The vehicle assembly of claim 1, wherein the first component is a cast component.

5. The vehicle assembly of claim 1, wherein the second component is an extruded component.

6. The vehicle assembly of claim 1, wherein the outer surface is a planar outer surface.

7. The vehicle assembly of claim 1, wherein the second component does not provide a clearance throughhole for the mechanical fastener prior to rotating the mechanical fastener to drive the mechanical fastener through the floor.

8. The vehicle assembly of claim 1, wherein the mechanical fastener has a head and a shaft extending from the head,
wherein, when the mechanical fastener is joining the first component to the second component, the head is configured to directly contact the stand-off, and the shaft is configured to extend along a longitudinal axis of the mechanical fastener through the cavity and the interface between the first and second component, the longitudinal axis of the mechanical fastener is oriented nonperpendicularly to the interface.

9. The vehicle assembly of claim 8, further comprising the mechanical fastener.

10. A vehicle assembly, comprising: a first component having a stand-off that provides a cavity, the stand-off protruding from an insertion side of the first component, the stand-off including at least one side wall that extends from a floor of the cavity to at least one outer surface of the stand-off; and a second component contacting the first component at an interface, wherein the cavity is configured to receive a mechanical fastener that joins the first component to the second component wherein a distance between the floor of the cavity and the interface is greater in some areas than in other areas such that a cross-sectional thickness at a bottom of the cavity is varied, wherein the mechanical fastener is a single-sided fastener; wherein the at least one outer surface of the stand-off is disposed along an outer surface plane, and the interface is disposed along an interface plane that is transverse to the outer surface plane; wherein the at least one side wall is an at least one inner side wall, the stand-off further including at least one outer side wall extending from the insertion side of the first component to the at least one outer surface.

11. The vehicle assembly of claim 10, wherein the mechanical fastener is a flow drill screw.

12. The vehicle assembly of claim 10, wherein the insertion side is disposed along an insertion side plane that is transverse to the outer surface plane.

13. The vehicle assembly of claim 10, wherein the outer surface is a planar outer surface.

14. The vehicle assembly of claim 10, wherein a floor of the first component lacks a clearance throughhole for the mechanical fastener prior to rotating the mechanical fastener to drive the mechanical fastener through the floor.

15. The vehicle assembly of claim 10, wherein the mechanical fastener has a head and a shaft extending from the head,
   wherein, when the mechanical fastener is joining the first component to the second component, the head is configured to directly contact the stand-off, and the shaft is configured to extend along a longitudinal axis of the mechanical fastener through the cavity and the interface between the first and second component, the longitudinal axis of the mechanical fastener is oriented nonperpendicularly to the interface.

16. The vehicle assembly of claim 15, further comprising the mechanical fastener.

* * * * *